US009672041B2

(12) United States Patent
Chiao et al.

(10) Patent No.: US 9,672,041 B2
(45) Date of Patent: Jun. 6, 2017

(54) METHOD FOR COMPRESSING VARIABLE-LENGTH INSTRUCTIONS INCLUDING PC-RELATIVE INSTRUCTIONS AND PROCESSOR FOR EXECUTING COMPRESSED INSTRUCTIONS USING AN INSTRUCTION TABLE

(71) Applicant: ANDES TECHNOLOGY CORPORATION, Hsin-Chu (TW)

(72) Inventors: Wei-Hao Chiao, Hsinchu (TW); Hong-Men Su, Hsinchu County (TW); Haw-Luen Tsai, Taipei (TW)

(73) Assignee: ANDES TECHNOLOGY CORPORATION, Hsin-Chu (TW)

( * ) Notice: Subject to any disclaimer, the term of this patent is extended or adjusted under 35 U.S.C. 154(b) by 511 days.

(21) Appl. No.: 13/956,382

(22) Filed: Aug. 1, 2013

(65) Prior Publication Data
US 2015/0039863 A1 Feb. 5, 2015

(51) Int. Cl.
*G06F 9/30* (2006.01)
*G06F 9/45* (2006.01)

(52) U.S. Cl.
CPC ........ *G06F 9/30178* (2013.01); *G06F 8/4434* (2013.01); *G06F 8/4436* (2013.01); *G06F 9/30156* (2013.01)

(58) Field of Classification Search
CPC .......................................... G06F 9/00–9/3897
See application file for complete search history.

(56) References Cited

U.S. PATENT DOCUMENTS 5,822,578 A * 10/1998 Frank .................... G06F 9/3005
  711/E12.024
6,189,137 B1 * 2/2001 Hoffman ............... G06F 8/4436
  717/115

(Continued)

FOREIGN PATENT DOCUMENTS

JP   H04-075138   3/1992
JP   2002318686   10/2002
JP   2007094813   4/2007

OTHER PUBLICATIONS

Lefurgy, Charles, et al. "Improving code density using compression techniques." CSE-TR-342-97, Technical Report, EECS Department, University of Michigan; Jul. 1997, 18 total pages.*

(Continued)

*Primary Examiner* — Keith Vicary
(74) *Attorney, Agent, or Firm* — Jianq Chyun IP Office

(57) ABSTRACT

A method for compressing instruction is provided, which includes the following steps. Analyze a program code to be executed by a processor to find one or more instruction groups in the program code according to a preset condition. Each of the instruction groups includes one or more instructions in sequential order. Sort the one or more instruction groups according to a cost function of each of the one or more instruction groups. Put the first X of the sorted one or more instruction groups into an instruction table. X is a value determined according to the cost function. Replace each of the one or more instruction groups in the program code that are put into the instruction table with a corresponding execution-on-instruction-table (EIT) instruction. The EIT instruction has a parameter referring to the corresponding instruction group in the instruction table.

17 Claims, 4 Drawing Sheets

(56) References Cited

U.S. PATENT DOCUMENTS

| | | |
|---|---|---|
| 6,907,598 B2 | 6/2005 | Fraser |
| 7,386,709 B2 | 6/2008 | Vasekin |
| 2002/0169946 A1* | 11/2002 | Budrovic ............ G06F 9/30178 712/209 |
| 2003/0033482 A1* | 2/2003 | Yamada ............ G06F 9/30178 711/119 |
| 2003/0086620 A1* | 5/2003 | Lucco ................ G06F 8/4434 382/232 |
| 2003/0131216 A1* | 7/2003 | Henkel ............ G06F 9/30178 712/200 |
| 2004/0111710 A1* | 6/2004 | Chakradhar ............ G06F 9/445 717/136 |
| 2004/0139298 A1* | 7/2004 | Holloway ........... G06F 9/30156 712/210 |
| 2012/0265972 A1* | 10/2012 | Zwartenkot ........... G06F 8/4434 712/226 |
| 2014/0115304 A1 | 4/2014 | Mauro |

OTHER PUBLICATIONS

Das, D.; Kumar, R.; Chakrabarti, P.P., "Dictionary based code compression for variable length instruction encodings," in VLSI Design, 2005. 18th International Conference on; 6 total pages, Jan. 3-7, 2005.*

Gupta, S. S., et al. "Code Compression for RISC Processors with Variable Length Instruction Encoding." High Performance Computing HiPC 2003; 5 total pages.*

C. Lefurgy. Efficient Execution of Compressed Programs. PhD thesis for University of Michigan, 2000; 212 pages.*

Saloman et al. (Handbook of Data Compression), Fifth Edition, 2010, 4 total pages.*

Takashi Nakano, et al., "Cogeneration of an Embedded Microprocessor and Its Object Code to Minimize Memory Consumption," vol. 2000, No. 74, IPSJ, 2000-ARC-139, Aug. 2000, pp. 139-144.

* cited by examiner

METHOD FOR COMPRESSING VARIABLE-LENGTH INSTRUCTIONS INCLUDING PC-RELATIVE INSTRUCTIONS AND PROCESSOR FOR EXECUTING COMPRESSED INSTRUCTIONS USING AN INSTRUCTION TABLE

BACKGROUND OF THE INVENTION

Field of the Invention

The present invention relates to instruction compression. More particularly, the present invention relates to a method for compressing instructions and a processor for executing compressed instructions.

Description of the Related Art

The length of an instruction set is the length in bits of each instruction in the instruction set. A long instruction can encode more operations. For example, moving a big constant to a register can be encoded as a long instruction. However, a long instruction set enlarges program code size. To reduce code size, frequently used long instructions can be compressed by encoding them as short instructions if the encoding length is enough.

In the conventional instruction compression, the mapping between the long instructions and the short instructions are fixed to all programs. In a program, if its frequently used long instructions do not have the short instruction mapping, the code size of this program can not be saved.

SUMMARY OF THE INVENTION

Accordingly, the present invention is directed to a method for compressing instructions and a processor for executing compressed instructions.

According to an embodiment of the present invention, a method for compressing instructions is provided, which includes the following steps. Analyze a program code to find one or more instruction groups in the program code according to a preset condition. Each of the instruction groups includes one or more instructions in sequential order. Sort the one or more instruction groups according to a cost function of each of the one or more instruction groups. Put the first X of the sorted one or more instruction groups into an instruction table. X is a value determined according to the cost function. Replace each of the one or more instruction groups in the program code that are put into the instruction table with a corresponding execution-on-instruction-table (EIT) instruction. The EIT instruction has a parameter referring to the corresponding instruction group in the instruction table.

According to another embodiment of the present invention, a processor for executing compressed instructions is provided, which includes an instruction table circuit, an instruction fetching circuit, an instruction decoder, an execution circuit, and an EIT execution circuit. The instruction table circuit includes an instruction table storing one or more instruction groups. Each of the one or more instruction groups includes one or more instructions. The instruction fetching circuit fetches an instruction of a program code executed by the processor. The instruction decoder is coupled to the instruction fetching circuit for identifying whether the fetched instruction is an EIT instruction or a typical instruction. The EIT instruction has a parameter referring to a corresponding instruction group in the instruction table. The execution circuit is coupled to the instruction decoder for executing the typical instruction. The EIT execution circuit is coupled to the instruction table circuit and the instruction decoder for executing the one or more instructions of the instruction group corresponding to the EIT instruction.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
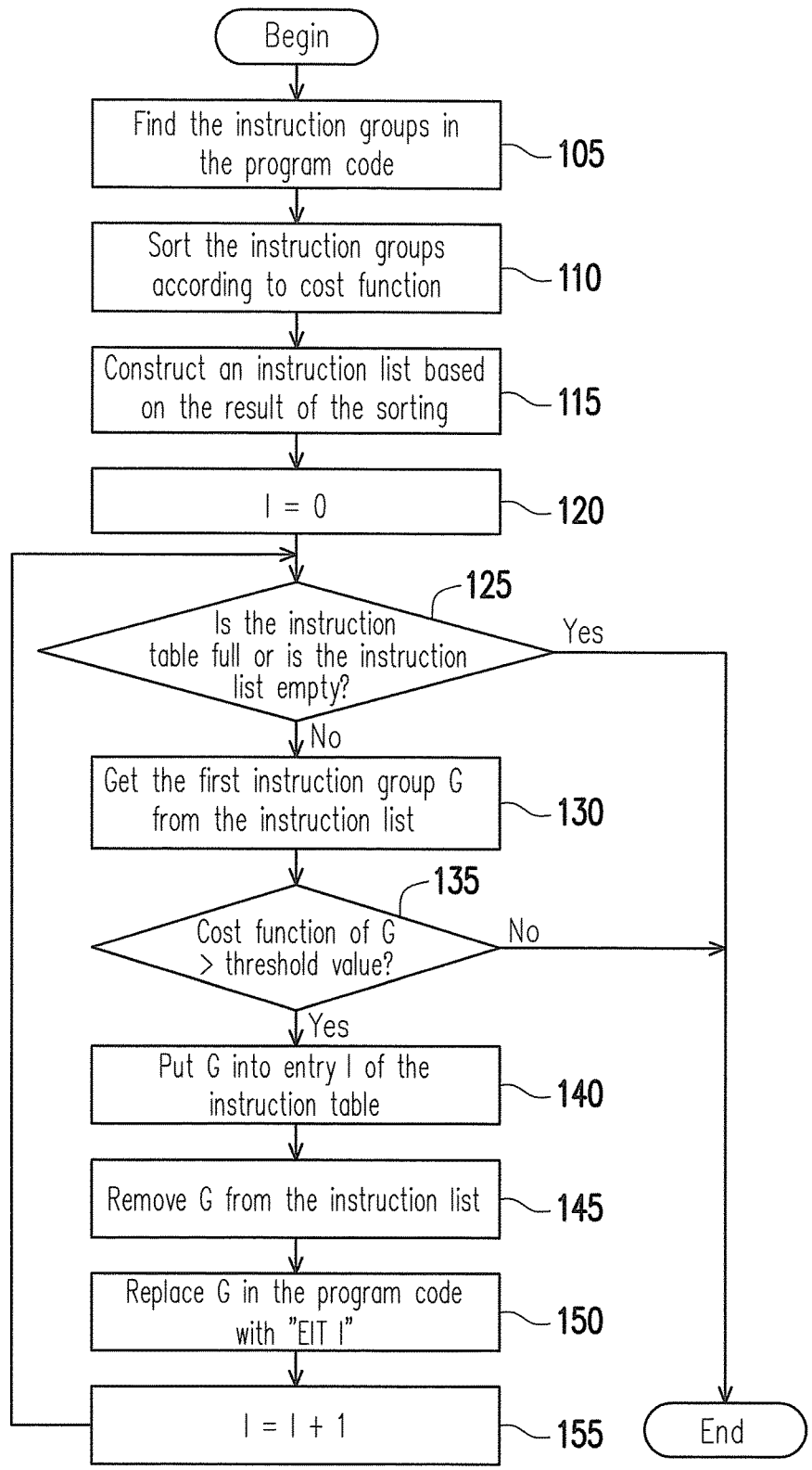
FIG. 1 is a schematic diagram showing the flow of a method for compressing instructions according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention provides a method for compressing instructions and a processor for executing compressed instructions. The processor includes a multi-length instruction set architecture (ISA) that includes a plurality of instruction sets of different lengths. For example, the processor in the following embodiments of the present invention includes a 48-bit instruction set, a 32-bit instruction set and a 16-bit instruction set.

The aforementioned method puts long-length frequently used instruction groups into an instruction table. Each of the instruction groups may include one or more instructions in sequential order in a program code to be executed by the aforementioned processor. The method replaces the long-length frequently used instruction groups with shorter EIT instructions. Each EIT instruction has a parameter that is an index referring to the corresponding instruction group in the instruction table. The EIT instruction has only one parameter whose value is relatively small. Therefore, the EIT instruction can be included in the shortest instruction set. In this way, the method provided by the present invention can effectively reduce program code size and still maintain versatility of the longer instruction sets.

FIG. 1 is a schematic diagram showing the flow of a method for compressing instructions according to an embodiment of the present invention. The method may be executed by the aforementioned processor or other similar apparatus. At step 105, analyze a program code to find one or more instruction groups in the program code according to a preset condition. In this embodiment, the preset condition is that the count of occurrences in the program code of each of the instruction groups must be larger than or equal to a first threshold value and the size (in bits) of each of the instruction groups must be smaller than or equal to a second threshold value. The first threshold value is used to find frequently used instruction groups. The second threshold value is used to ensure that the instruction groups can fit into the instruction table. In this embodiment, the second threshold value is equal to the length of the longest instruction set of the processor, which is also the length of the longest instruction group that the instruction table can accommodate.

Figure 2:
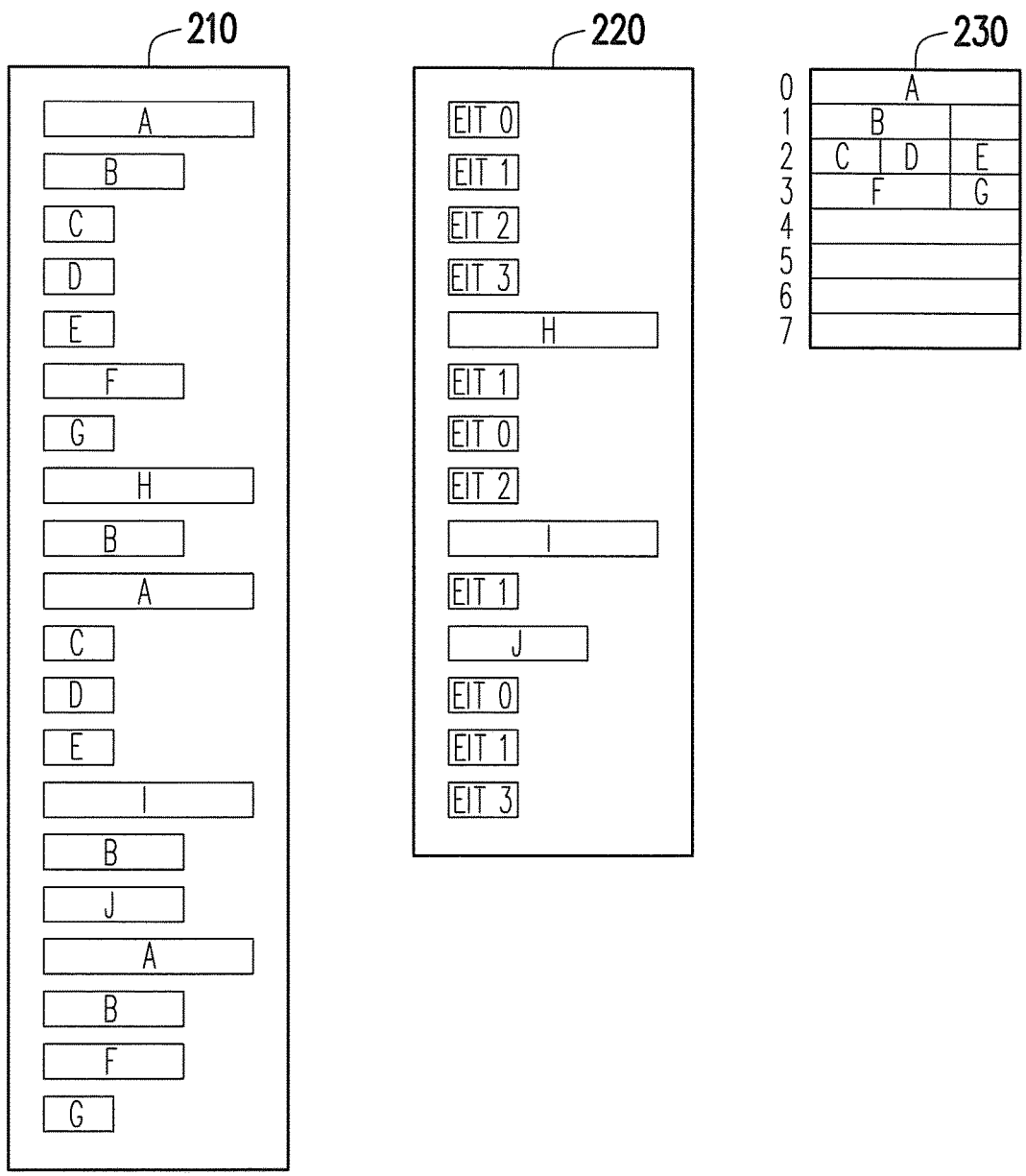
FIG. 2 is a schematic diagram showing compression of instructions according to an embodiment of the present invention.

FIG. 2 shows an example of some instruction groups in a program code according to an embodiment of the present invention. The method shown in FIG. 1 may compress the program code 210 into the program code 220 with the help of the instruction table 230. The program code 210 includes instructions A-J. The instructions A, H and I belong to the 48-bit instruction set. The instructions B, F and J belong to the 32-bit instruction set. The instructions C, D, E and G belong to the 16-bit instruction set. When the first threshold value is 2 and the second threshold value is 48, step 105 in FIG. 1 may find four instruction groups in the program code 210. The first instruction group includes the instruction A. The second instruction group includes the instruction B. The third instruction group includes the instructions C, D and E. The fourth instruction group includes the instructions F and G.

Next, at step 110, sort the instruction groups found in step 105 in descending order of the cost function of each instruction group. In this embodiment, the cost function of each instruction group K is defined as "$CC_K*(L_K-N)-M$". $CC_K$ is the count of occurrences of the instruction group K in the program code. $L_K$ is the length (in bits) of the instruction group K. N is the length (in bits) of the EIT instruction, which is also the length of the shortest instruction set of the processor. M is the aforementioned second threshold value. The cost function means the number of bits saved by replacing an instruction group with its corresponding EIT function.

Next, at step 115, construct an instruction list based on the result of the aforementioned sorting. The instruction list includes all of the instruction groups and the instruction groups in the instruction list retain their sorted order. Therefore, the first instruction group of the instruction list is the instruction group whose cost function value is the largest.

At step 120, set an index variable I to be zero. At step 125, check whether the instruction table is already full or not, and check whether the instruction list is empty or not. The flow terminates when the instruction table is full or the instruction list is empty. The flow proceeds to step 130 when the instruction table still has vacancy and the instruction list is not empty.

At step 130, get the first instruction group G from the instruction list. At step 135, check whether the value of the cost function of the instruction group G is larger than a third threshold value or not. In this embodiment, the third threshold value is 0. The third threshold value may be any other integer value in the other embodiments of the present invention. The flow terminates when the value of the cost function of the instruction group G is smaller than or equal to the third threshold value. The flow proceeds to step 140 when the value of the cost function of the instruction group G is larger than the third threshold value.

At step 140, put the instruction group G into entry I of the instruction table. At step 145, remove the instruction group G from the instruction list. At step 150, replace the instruction group G in the program code with the corresponding EIT instruction "EIT I". At step 155, increase the index variable I by one and then the flow returns to step 125.

For example, FIG. 2 shows the instruction table 230 generated based on the program code 210. The numbers on the left side of the instruction table 230 are the indices of the entries of the instruction table 230. The program code 210 becomes the program code 220 after replacing the aforementioned four instruction groups with their corresponding EIT instructions. Each EIT instruction has a parameter that is the index of the corresponding instruction group in the instruction table 230. For example, the index of the third instruction group that includes the instructions C, D and E in the instruction table 230 is 2. Therefore, the third instruction group in the program code 210 is replaced with the EIT instruction "EIT 2", wherein the constant 2 is the parameter of the EIT instruction. In this embodiment, the length of each EIT instruction is 16 bits, which is shorter than that of the corresponding instruction group. Therefore, the size of the program code 220 is much smaller than that of the program code 210.

It can be seen from FIG. 1 and FIG. 2 that the method in FIG. 1 puts the first X of the instruction groups sorted in step 110 into the instruction table. X is the minimum value of two values Y and Z. Y is the maximum number of entries of the instruction table, while Z is the number of the instruction groups whose cost functions are larger than the aforementioned third threshold value.

Figure 3:
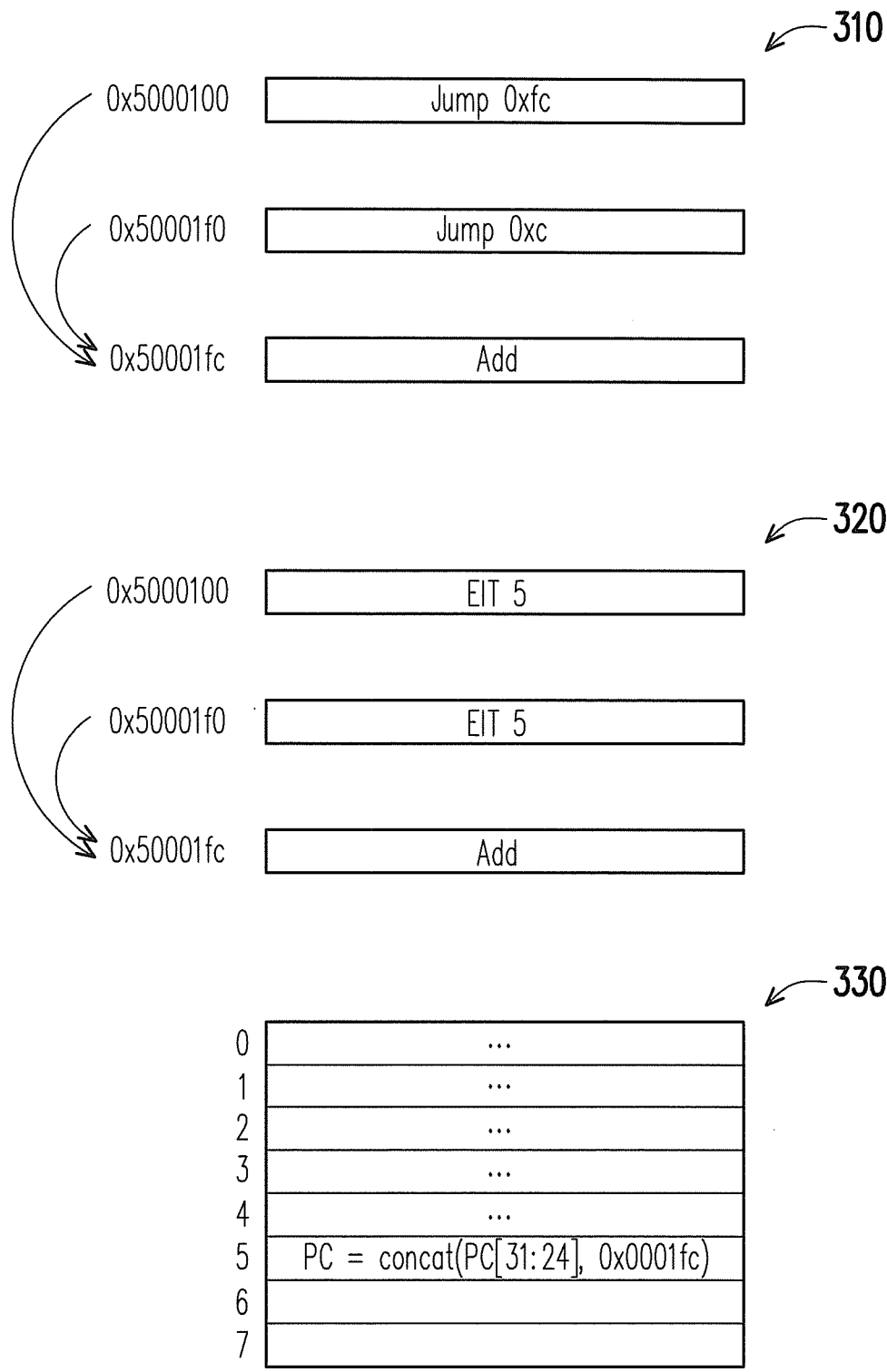
FIG. 3 is a schematic diagram showing compression of instructions according to another embodiment of the present invention.

FIG. 3 shows an instruction table 330 generated based on a program code 310 according to an embodiment of the present invention. The method shown in FIG. 1 may compress the program code 310 into the program code 320 with the help of the instruction table 330.

The program code 310 includes two program-counter-relative (PC-relative) jump instructions and an add instruction. The teen "PC-relative" means the target address of the jump is calculated by adding the current value of the program counter (PC) of the processor and the offset parameter of the instruction. For example, the PC-relative jump instruction at the address 0x5000100 has an offset parameter 0xfc. Here the prefix "0x" means hexadecimal constants. The target address of the PC-relative jump instruction at the address 0x5000100 is 0x50001fc. The execution flow of the processor jumps to the add instruction at the address 0x50001fc after executing the PC-relative jump instruction at the address 0x5000100. Similarly, the target address of the PC-relative jump instruction at the address 0x50001f0 is also 0x50001fc. The execution flow of the processor jumps to the add instruction at the address 0x50001fc after executing the PC-relative jump instruction at the address 0x50001f0.

Jump instructions are long-length instructions to allow large offset parameters. Therefore, jump instructions are suitable for compression. However, if the method in FIG. 1 simply compares instruction codes to find instruction groups in step 105, the two PC-relative jump instructions in the program code 310 would be regarded as different instructions because their offset parameters are different. In this case, the method in FIG. 1 would overlook the two PC-relative jump instructions in the program code 310.

In this embodiment, step 105 of the method in FIG. 1 may compare target addresses of the two PC-relative instructions. If the target addresses of the two PC-relative instructions are the same, the two PC-relative jump instructions in the program code 310 can be bound into an instruction group. In this case, when step 140 in FIG. 1 is putting a PC-relative jump instruction into the instruction table, step 140 may replaces the PC-relative jump instruction with a concatenate instruction whose target address is the same as the target address of the PC-relative jump instruction.

For example, as shown in FIG. 3, the PC-relative jump instructions in the program code 310 are recognized as an instruction group whose index in the instruction table 330 is 5. Accordingly, the PC-relative jump instructions in the program code 310 are replaced with the EIT instructions "EIT 5" and in the fifth entry of the instruction table 330 the PC-relative jump instructions are replaced with the concatenate instruction "PC=concat(PC[31,24], 0x0001fc)". The PC in this embodiment has 32 bits. The concatenate instruction concatenates the 8 most significant bits (MSBs) of the PC with the 24 LSBs of the target address of the PC-relative jump instructions and stores the result of the concatenation into the PC. The EIT instruction "EIT 5" effectively replaces and compresses the PC-relative jump instructions. In the other embodiments of the present invention, the numbers 8, 24 and 32 above may be replaced with other preset integers.

The example above assumes that the instruction sets supported by the processor include the aforementioned concatenate instruction. The PC-relative jump instructions can still be compressed when the instruction sets do not include the aforementioned concatenate instruction. In this case, the PC-relative jump instructions in the program code 310 are still replaced with the corresponding EIT instructions. However, the entry of the instruction table 330 corresponding to the PC-relative jump instructions records the opcode and the operand of the PC-relative jump instruction. In this case, the operand is the 24 LSBs of the target address of the PC-relative jump instruction. When the processor fetches the EIT instruction and sees the opcode of the PC-relative jump instruction in the corresponding entry of the instruction table 330, the processor executes the aforementioned concatenation of the concatenate instruction instead of executing the PC-relative jump instruction. The operand of the PC-relative jump instruction serves as the operand of the concatenate instruction. Take the PC-relative jump instructions in FIG. 3 as example, the entry of the instruction table 330 corresponding to the PC-relative jump instructions records "jump 0x1fc" and the processor executes "concat(PC[31,24], 0x1fc)" in response to the entry.

The compression of PC-relative jump instructions above may be extended to compress all types of PC-relative instructions, including PC-relative conditional jump instructions (also known as PC-relative conditional branch instructions), PC-relative subroutine call instructions, PC-relative load instructions, and PC-relative store instructions. For some PC-relative instructions such as PC-relative load instructions and PC-relative store instructions, the result of the concatenation is not stored into the PC because these instructions do not change the contents of the PC.

Figure 4:
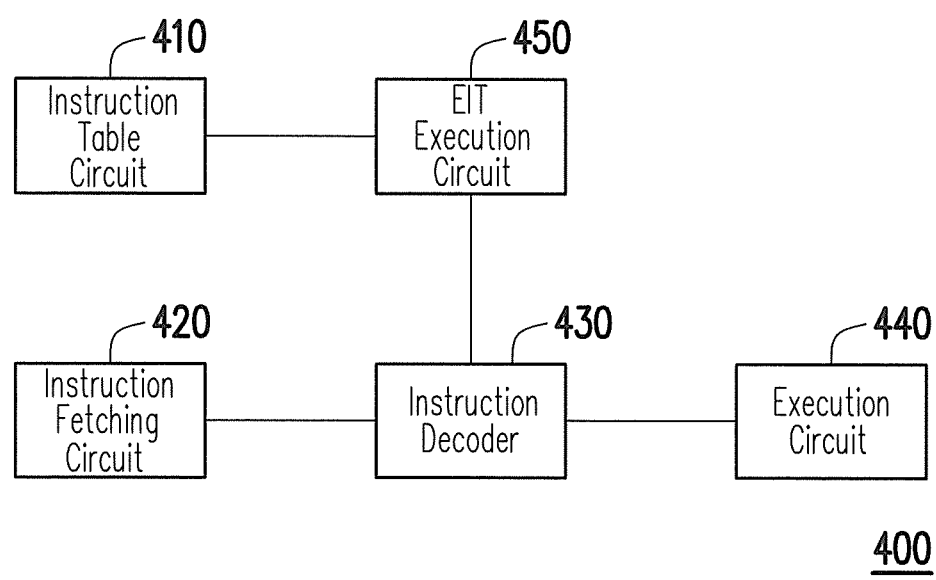
FIG. 4 is a schematic diagram showing a processor for executing compressed instructions according to an embodiment of the present invention.

FIG. 4 is a schematic diagram showing a processor 400 for executing compressed instructions according to an embodiment of the present invention. The processor 400 includes an instruction table circuit 410, an instruction fetching circuit 420, an instruction decoder 430 coupled to the instruction fetching circuit 420, an execution circuit 440 coupled to the instruction decoder 430, and an EIT execution circuit 450 coupled to the instruction table circuit 410 and the instruction decoder 430.

The instruction table circuit 410 includes the aforementioned instruction table. The instruction table circuit 410 may include a memory storing the instruction table so that each program code has its customized instruction table which yields maximum code size saving. Alternatively, the instruction table may be hardwired in the instruction table circuit 410 for better performance.

The instruction fetching circuit 420 fetches instructions of program codes executed by the processor 400. The instruction decoder 430 identifies each instruction fetched by the instruction fetching circuit 420 to determine whether the fetched instruction is an EIT instruction or a typical instruction. Here the term "typical instruction" means any instruction that is not an EIT instruction. When the fetched instruction is a typical instruction, the execution circuit 440 executes the typical instruction. When the fetched instruction is an EIT instruction, the EIT execution circuit 450 gets the corresponding instruction group from the instruction table according to the parameter of the EIT instruction and then executes the one or more instructions of the corresponding instruction group.

For example, when the execution flow of the processor 400 proceeds to the instruction H in the program code 220 in FIG. 2, the execution circuit 440 executes the instruction H. Next, the EIT execution circuit 450 executes the instruction "EIT 1" by executing the instruction B in the 1st entry of the instruction table 230. Next, the EIT execution circuit 450 executes the instruction "EIT 0" by executing the instruction A in the 0th entry of the instruction table 230. Next, the EIT execution circuit 450 executes the instruction "EIT 2" by executing in sequential order the instructions C, D and E in the 2nd entry of the instruction table 230. Next, the execution circuit 440 executes the instruction I. Next, the EIT execution circuit 450 executes the instruction "EIT 1" by executing the instruction B in the 1st entry of the instruction table 230, and so on.

In summary, the method and processor provided by the present invention can compress a long-length computer instruction to a short-length computer instruction to reduce code size and retain the versatility of the longer instruction sets. The EIT instruction provided by the present invention can be encoded as an instruction with the shortest length for maximum code size saving. Due to the flexibility of the instruction table provided by the present invention, different program codes may have different optimal mappings between the frequently used long-length instructions and their corresponding short-length instructions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A method for compressing instructions, comprising:
analyzing a program code to be executed by a processor to find instruction groups in the program code according to a preset condition, wherein each occurrence of an instruction group comprises one or more instructions in sequential order, wherein instructions at a same order of appearance of individual occurrences of a same instruction group have a same binary encoding or are program-counter-relative (PC-relative) instructions performing a same function with a same target address, wherein the PC-relative instructions are replaced by a concatenate instruction in the instruction group, the concatenate instruction performs a same function and computes a same target address as the PC-relative instructions by concatenating a part of bits of a program counter and an operand of the concatenate instruction, and the PC-relative instructions comprise PC-relative jump instructions;
sorting the instruction groups according to a cost function of each of the instruction groups;
putting the first X of the sorted instruction groups into an instruction table, wherein X is a value determined according to the cost function, and X is greater than 0 and smaller than a number of instruction groups; and replacing each occurrence of the first X of the sorted instruction groups in the program code that are put into the instruction table with a corresponding execution-on-instruction-table (EIT) instruction, wherein the corresponding EIT instruction has a parameter referring to the corresponding instruction group in the instruction table.

2. The method of claim 1, wherein the preset condition is that a count of occurrences in the program code of each of the instruction groups is larger than or equal to a first threshold value and a size of each of the instruction groups is smaller than or equal to a second threshold value.

3. The method of claim 2, wherein the cost function of each of the instruction groups is respectively defined according to a count of occurrences of a corresponding instruction group, a length of the corresponding instruction group, a length of the corresponding EIT instruction, and the second threshold value.

4. The method of claim 2, wherein the processor comprises a plurality of instruction sets of different lengths, the second threshold value is equal to a length of the longest one of the instruction sets, and the corresponding EIT instruction belongs to the shortest one of the instruction sets.

5. The method of claim 1, wherein the parameter is an index of the instruction group corresponding to the corresponding EIT instruction in the instruction table.

6. The method of claim 1, wherein the step of sorting the instruction groups comprises:

sorting the instruction groups in descending order of the cost function of each of the instruction groups.

7. The method of claim 1, wherein X is a minimum value of Y and Z, Y is a maximum number of entries of the instruction table, and Z is a number of instruction groups in the program code whose cost functions are larger than a third threshold value.

8. The method of claim 1, wherein the PC-relative instructions comprise PC-relative conditional jump instructions and PC-relative unconditional jump instructions.

9. The method of claim 1, wherein the PC-relative instructions comprise PC-relative subroutine call instructions.

10. A processor for executing compressed instructions, comprising:

an instruction table circuit, comprising an instruction table storing instruction groups, wherein each of the instruction groups comprises one or more instructions, and each instruction group is found in a program code by recognizing occurrences of a same one or more instructions, wherein instructions at a same order of appearance of individual occurrences have a same binary encoding, or are program-counter-relative (PC-relative) instructions performing a same function with a same target address, wherein the PC-relative instructions are replaced by a concatenate instruction in the instruction group, wherein the instruction groups are sorted according to a cost function of each of the instruction groups, the first X of the sorted instruction groups are put into an instruction table, X is a value determined according to the cost function, X is greater than 0 and smaller than a number of instruction groups, and the concatenate instruction is put into the instruction table, and the PC-relative instructions comprise PC-relative jump instructions;

an instruction fetching circuit, fetching an instruction of a program code executed by the processor;

an instruction decoder, identifying whether the instruction fetched by the instruction fetching circuit is an execution-on-instruction-table (EIT) instruction or a typical instruction, wherein the EIT instruction has a parameter referring to a corresponding instruction group in the instruction table;

an execution circuit, executing the typical instruction; and an EIT execution circuit, executing the one or more instructions of the instruction group corresponding to the EIT instruction and computing a target address of a concatenate instruction by concatenating a preset number of most significant bits of a program counter of the processor with an operand associated with the concatenate instruction.

11. The processor of claim 10, wherein the instruction table circuit comprises a memory storing the instruction table.

12. The processor of claim 10, wherein the instruction table is hardwired in the instruction table circuit.

13. The processor of claim 10, wherein the parameter is an index of the instruction group corresponding to the EIT instruction in the instruction table.

14. The processor of claim 10, wherein the EIT execution circuit gets the corresponding instruction group from the instruction table according to the parameter and then executes the one or more instructions of the corresponding instruction group.

15. The processor of claim 10, wherein the processor comprises a plurality of instruction sets of different lengths, a length of each of the instruction groups is smaller than or equal to a length of the longest one of the instruction sets, and the EIT instruction belongs to the shortest one of the instruction sets.

16. The processor of claim 10, wherein the PC-relative instructions comprise PC-relative conditional jump instructions and PC-relative unconditional jump instructions.

17. The processor of claim 10, wherein the PC-relative instructions comprise PC-relative subroutine call instructions.

* * * * *